(12) United States Patent
Hoffman

(10) Patent No.: US 9,268,038 B2
(45) Date of Patent: Feb. 23, 2016

(54) REFLECTOR FOR RADIATION DETECTOR

(75) Inventor: David Michael Hoffman, New Berlin, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 198 days.

(21) Appl. No.: 13/585,642

(22) Filed: Aug. 14, 2012

(65) Prior Publication Data

US 2014/0048712 A1    Feb. 20, 2014

(51) Int. Cl.
*G01T 1/20*     (2006.01)
*G01T 1/202*    (2006.01)

(52) U.S. Cl.
CPC ............ *G01T 1/2002* (2013.01); *G01T 1/202* (2013.01)

(58) Field of Classification Search
CPC ............................ G01T 1/2002; G01T 1/202
See application file for complete search history.

(56) References Cited

U.S. PATENT DOCUMENTS

| | | | | |
|---|---|---|---|---|
| 5,378,894 A | * | 1/1995 | Akai | 250/368 |
| 5,866,908 A | * | 2/1999 | Novak | 250/368 |
| 7,626,176 B2 | | 12/2009 | Zeitler et al. | |
| 2007/0013998 A1 | * | 1/2007 | Wu et al. | 359/361 |
| 2010/0072376 A1 | * | 3/2010 | Ronda | 250/362 |
| 2010/0207031 A1 | * | 8/2010 | Leppert | 250/368 |

* cited by examiner

*Primary Examiner* — Kiho Kim
(74) *Attorney, Agent, or Firm* — Fletcher Yoder, P.C.

(57) ABSTRACT

A radiation detector includes a scintillator layer configured to absorb radiation emitted from a radiation source and to emit optical photons in response to the absorbed radiation. The radiation detector also includes a photodetector layer configured to absorb the optical photons emitted by the scintillator layer. The radiation detector further includes a reflector configured to reflect the optical photons emitted by the scintillator layer towards the photodetector layer and to absorb select wavelengths of optical photons associated with an afterglow emitted by the scintillator layer.

23 Claims, 2 Drawing Sheets

REFLECTOR FOR RADIATION DETECTOR

BACKGROUND

The subject matter disclosed herein relates to radiographic detectors for non-invasive imaging and particularly to the use of a reflector with the radiographic detectors.

In radiographic systems, an X-ray source emits radiation (e.g., X-rays) towards an object or subject (e.g., a patient, a manufactured part, a package, or a piece of baggage) to be imaged. As used herein, the terms "subject" and "object" may be interchangeably used to describe anything capable of being imaged. The emitted X-rays, after being attenuated by the subject or object, typically impinge upon an array of radiation detector elements of an electronic detector. The intensity of radiation reaching the detector is typically dependent on the attenuation and absorption of X-rays through the scanned subject or object. At the detector, a scintillator may convert some of the X-ray radiation to lower energy optical photons that strike detector elements configured to detect the optical photons. Each of the detector elements then produces a separate electrical signal indicative of the amount of optical light detected, which generally corresponds to the incident X-ray radiation at the particular location of the element. The electrical signals are collected, digitized and transmitted to a data processing system for analysis and further processing to reconstruct an image.

After X-ray excitation, the scintillator continues to emit a broad spectrum of wavelengths of optical photons for an extended period of time (e.g., microseconds to milliseconds) known as an afterglow signal. Different wavelengths of light from the afterglow signal may persist for different amounts of time after the X-ray excitation, with some wavelengths persisting longer than other wavelengths. The afterglow signal may result in artifacts in the reconstructed image.

BRIEF DESCRIPTION

In accordance with a first embodiment, a radiation detector includes a scintillator layer configured to absorb radiation emitted from a radiation source and to emit optical photons in response to the absorbed radiation. The radiation detector also includes a photodetector layer configured to absorb the optical photons emitted by the scintillator layer. The radiation detector further includes a reflector configured to reflect the optical photons emitted by the scintillator layer towards the photodetector layer and to absorb select wavelengths of optical photons associated with an afterglow emitted by the scintillator layer.

In accordance with a second embodiment, an imaging system includes a radiation source configured to emit radiation. The imaging system also includes a radiation source configured to detect the emitted radiation. The radiation detector includes a scintillator layer configured to absorb the emitted radiation and to emit optical photons in response to the absorbed radiation. The radiation detector also includes a photodetector layer configured to absorb the optical photons emitted by the scintillator layer. The radiation detector further includes a reflector comprising at least one absorbing material configured to absorb select wavelengths of optical photons associated with an afterglow emitted by the scintillator layer.

In accordance with a third embodiment, a radiation detector includes a reflector configured to be disposed about a scintillator layer. The reflector is also configured to reflect optical photons emitted by the scintillator layer towards a photodetector layer. The reflector includes at least one absorbing material configured to absorb select wavelengths of optical photons associated with an afterglow emitted by the scintillator layer.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present disclosure provides for utilizing an absorbing material within a reflector of a radiographic detector to suppress or absorb specific wavelengths of the scintillator afterglow (e.g., those wavelengths of the afterglow that persist with relatively longer time constants. For example, one or more absorbing materials (e.g., dyes) may be disposed or doped within the reflector. Each absorbing material may absorb specific wavelengths associated with the afterglow. Such a detector may be utilized in a variety of radiographic imaging systems, such as computed tomography (CT) systems, fluoroscopic imaging systems, mammography systems, tomosynthesis imaging systems, conventional radiographic imaging systems, and so forth.

By way of example, in accordance with one embodiment, a CT imaging system is provided. The CT imaging system includes a detector having a reflector that includes at least one absorbing material to suppress scintillator afterglow. The present discussion is generally provided in the context of a third generation CT system, however, the present disclosure is equally applicable to other systems. For simplicity, the present discussion generally describes the use of detectors and X-ray imaging systems in a medical imaging context. However, it should be appreciated that the described radiation detectors may also be used in non-medical contexts (such as security and screening systems and non-destructive detection systems).

Figure 1:
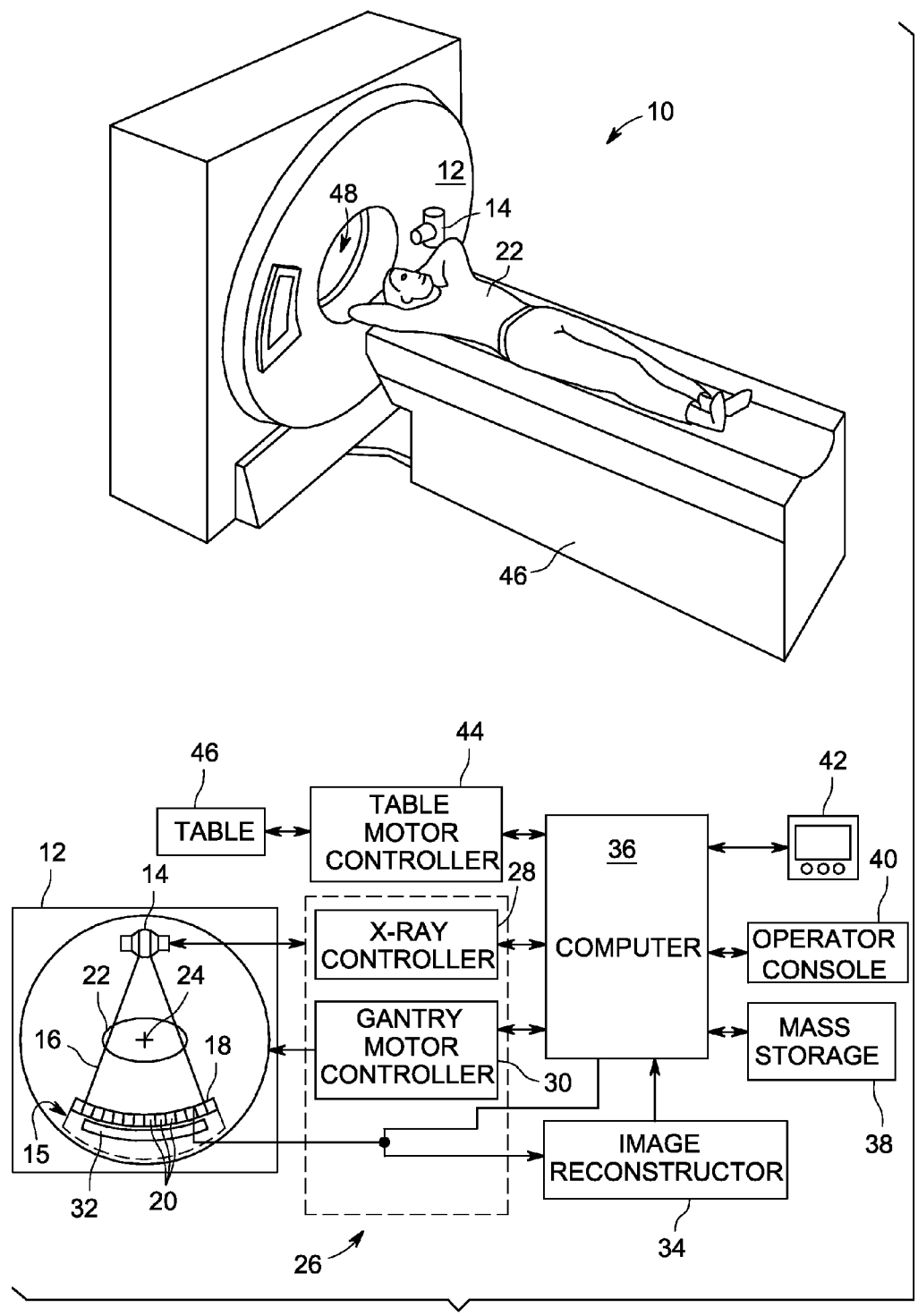
FIG. 1 is a combined pictorial view and block diagram of a CT imaging system illustrating an embodiment of the present disclosure.

With the foregoing in mind and referring to FIG. 1, a computed tomography (CT) imaging system 10 is shown as including a gantry 12 representative of a "third generation" CT scanner. Gantry 12 has an X-ray source 14 that projects a beam of X-rays 16 toward a detector assembly 15 on the opposite side of the gantry 12. The detector assembly 15 includes a collimator assembly 18, a plurality of detector modules 20, and data acquisition systems (DAS) 32. The plurality of detector modules 20 detect the projected X-rays that pass through a medical patient 22, and DAS 32 converts the data to digital signals for subsequent processing. Each detector module 20 in a conventional system produces an analog electrical signal that represents the intensity of an impinging X-ray beam and hence the attenuated beam as it passes through the patient 22. During a scan to acquire X-ray projection data, gantry 12 and the components mounted thereon rotate about a center of rotation 24.

Rotation of gantry 12 and the operation of X-ray source 14 are governed by a control mechanism 26 of CT system 10. Control mechanism 26 includes an X-ray controller 28 that provides power and timing signals to an X-ray source 14 and a gantry motor controller 30 that controls the rotational speed and position of gantry 12. An image reconstructor 34 receives sampled and digitized X-ray data from DAS 32 and performs high-speed reconstruction. The reconstructed image is applied as an input to a computer 36, which stores the image in a mass storage device 38. Computer 36 also receives commands and scanning parameters from an operator via console 40. An associated display 42 allows the operator to observe the reconstructed image and other data from computer 36. The operator supplied commands and parameters are used by computer 36 to provide control signals and information to DAS 32, X-ray controller 28, and gantry motor controller 30. In addition, computer 36 operates a table motor controller 44, which controls a motorized table 46 to position patient 22 and gantry 12. Particularly, table 46 moves portions of patient 22 through a gantry opening 48.

Figure 2:
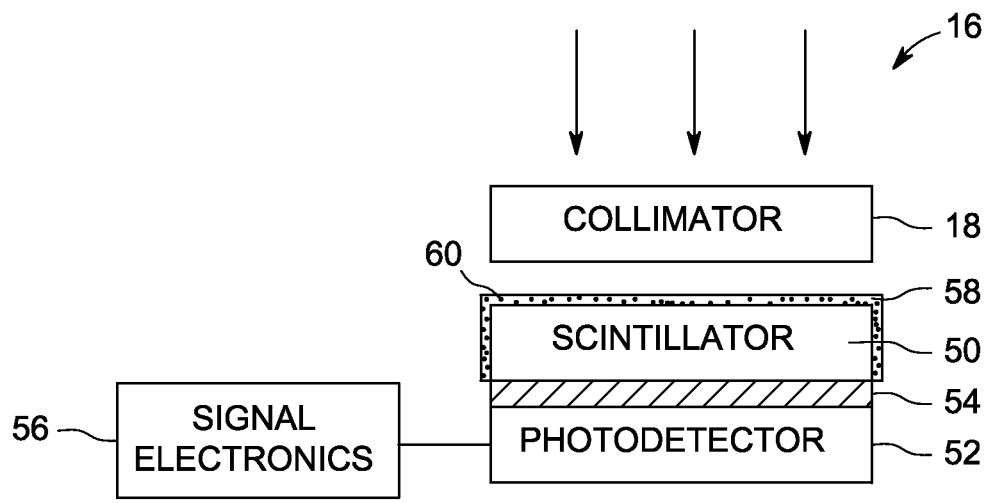
FIG. 2 is a view of components of a detector assembly in accordance with an embodiment of the present disclosure.

Referring now to FIG. 2, a schematic view of a detector 15 operating in accordance with certain aspects of the present disclosure is illustrated. During imaging, radiation 16 (e.g., X-rays) from an imaging source 12 impinge on a scintillator 50 (e.g., layer of scintillator elements) after being attenuated by an intervening subject or object undergoing imaging. In the depicted embodiment, the X-rays 16 are collimated by a collimator 18, after passing through the subject or object but prior to reaching the scintillator 50. Such collimation may provide some degree of X-ray scatter rejection and/or correction.

Typically, the scintillator 50 is formed from a substance that absorbs radiation 16 (for example X-ray photons) and in response emits light (e.g., isotropically) of a characteristic wavelength, such as an optical wavelength, thereby releasing the absorbed energy. With regard to the present technique, various types of scintillation materials (e.g., GE Gemstone™, GE Lumex™, gadolinium oxysulfide (GOS), etc.) may be employed which convert the radiation incident on the detector assembly 20, such as X-rays photons, into a form of radiation detectable by the photodetector layer 52 (e.g., a layer of photodiodes). Thus, in such an implementation, X-ray photons impinging on the detector assembly 15 can be detected by the photodetector layer 52, so long as the impinging X-ray photons interact with the scintillator 50 to generate one or more detectable photons, such as optical photons.

In one embodiment, the photodetector layer 52 is bonded to the scintillator 50 by an epoxy bonding material 54 or other suitable optical coupler. The photodetector layer 52 generates analog electrical signals in response to the light emitted by the scintillator 50. The electrical signals generated by the photodetector layer 52 are in turn acquired by signal electronics 56. The signals from the signal electronics 56 may in turn be acquired by the data acquisition circuitry 32 (FIG. 1). As discussed above, the acquired signals are supplied to data processing circuitry and/or to image reconstruction circuitry.

After each X-ray excitation sample period, the scintillator 50 continues to emit optical photons known as the afterglow that include a broad spectrum of wavelengths. The afterglow persists from multiple microseconds to milliseconds. In addition, the afterglow persists into subsequent samples or views. As a result, the afterglow is continuous and is a composite of the afterglow components from all previous views. Thus, the afterglow signal in one view may be dominated by the afterglow signal from a previous view. Certain wavelengths of the afterglow persist for varying amounts of time. The particular wavelengths and their associated time constants vary from scintillator material to scintillator material, but also somewhat, but much less from scintillator element to scintillator element because of variations in the manufacturing process, but can be easily determined for any given scintillator material through spectroscopic analysis techniques. In particular, some of the wavelengths of the afterglow may persist longer than other wavelengths after X-ray excitation of the scintillator 50. The specific wavelengths and how long after X-ray excitation of the scintillator 50 ceases that these longer-lasting wavelengths of the afterglow persist depends on the design of the detector 15 and its components and, thus, may vary between detectors 15.

In certain embodiments of the present disclosure, the detector 15 includes a reflector 58 disposed about the scintillator 50. The reflector 58 reflects the optical photons emitted by the scintillator 50 towards the photodetector 52. In addition, the reflector 58 includes one or more absorbing materials 60 (e.g., open circle represents a first absorbing material and filled or closed circle represents a second absorbing material) to absorb select wavelengths of optical photons emitted by the scintillator 50. The number of absorbing materials 60 disposed within the reflector 58 could vary from 1 to 10 or more. The absorbing materials 60 of the reflector 58 absorb those longer persisting wavelengths of the afterglow (e.g., long decay afterglow wavelengths). As mentioned above, the characteristics of these longer persisting wavelengths of the afterglow may vary depending on the detector design. Each absorbing material 60 may absorb specific wavelengths of the longer persisting wavelengths of the afterglow. The range of wavelengths absorbed by each absorbing material 60 may overlap or differ from other absorbing materials. In certain embodiments, the reflector 58 may be doped with the one or more absorbing materials 60. In certain embodiments, the absorbing materials 60 may include dyes or any other absorbing material (e.g., absorbing pigment) that absorbs the long decay afterglow wavelengths emitted by the scintillator 50. The dyes and pigments may be natural and/or synthetic. For example, the pigments and pigments may be inorganic or organic. The pigments may also include metals (e.g., cadmium, copper, etc.) and/or carbon.

As described in greater detail below, the reflector 58 may include a single reflective layer as depicted in FIG. 2. For example, the reflector 58 may include a thin reflective metallic film (e.g., foil). In this case the absorber could be a dielectric layered addition on the metallic film. The dielectric layered reflector or the dielectric layered absorber is made up of multiple very thin layers of Angstrom thickness that include the one or more absorbing materials. Alternatively, the reflector 58 may include multiple layers (see FIG. 3). For example, the reflector 58 may include alternating layers of high and low dielectric materials to form a dielectric mirror. In this case the absorber could have an added dielectric layered film for specific wavelength absorption. In certain embodiments, the reflector 58 may include a composite (e.g., epoxy-titanium dioxide ($TiO_2$) composite). Further, in some embodiments, the reflector 58 may include a cast reflector molded around multiple sides (e.g., 5 sides) of each scintillator element. These examples provide only a few examples (but not all) of the types of reflectors 58 that may include the one or more absorbing materials 60.

Figure 3:
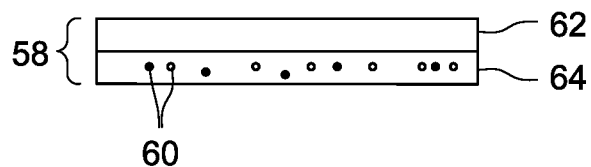
FIG. 3 is a view of a multilayered reflector for use with the detector assembly of FIG. 2 in accordance with an embodiment of the present disclosure.

FIG. 3 depicts a multilayered reflector 58 having one or more absorbent materials 60 for use with the detector 15 as described above. The reflector 58 includes a first layer 62 and a second layer 64. The first layer 62 may include a metal reflector layer. The second layer 64 may include a composite layer such as TiO$_2$ disposed in a binder (e.g., epoxy). The second layer 64 includes the one or more absorbing materials 60.

Figure 4:
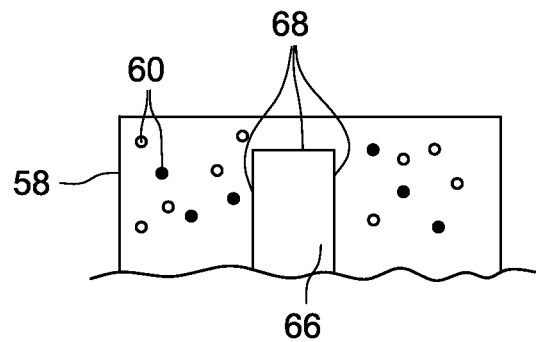
FIG. 4 is a view of a cast reflector disposed about a scintillator element for use with the detector assembly of FIG. 2 in accordance with an embodiment of the present disclosure.

FIG. 4 depicts a cast reflector 58 having one or more absorbent materials 60 for use with the detector 15 as described above. The reflector 58 is disposed about a scintillator element 66 of the scintillator 50. In particular, the reflector 58 may be molded or cast about the scintillator element 66 (e.g., five sides 68 of the scintillator element 66).

Technical effects of the disclosed embodiments include providing one or more absorbing materials 60 within the reflector 58 of the radiographic detector 15 to suppress or absorb specific wavelengths of the scintillator afterglow (e.g., those wavelengths of the afterglow that persist relatively longer. For example, one or more dyes may be disposed within the reflector 58 that absorb long decay afterglow wavelengths. The absorbing materials 60 disposed within the reflector 58 suppress the afterglow and minimize afterglow artifacts in reconstructed images.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A radiation detector comprising:
   a scintillator layer configured to absorb radiation emitted from a radiation source and to emit optical photons in response to the absorbed radiation;
   a photodetector layer configured to absorb the optical photons emitted by the scintillator layer; and
   a reflector configured to reflect the optical photons emitted by the scintillator layer towards the photodetector layer and to absorb select wavelengths of optical photons associated with an afterglow emitted by the scintillator layer.

2. The radiation detector of claim 1, wherein the reflector comprises at least one absorbing material configured to absorb specific wavelengths of the select wavelengths associated with the afterglow.

3. The radiation detector of claim 2, wherein the reflector comprises a plurality of absorbing materials, wherein each absorbing material is configured to absorb specific wavelengths of the select wavelengths associated with the afterglow.

4. The radiation detector of claim 2, wherein the at least one absorbing material comprises a dye or an absorbing pigment.

5. The radiation detector of claim 1, wherein the reflector comprises a single layer.

6. The radiation detector of claim 1, wherein the reflector comprises multiple layers.

7. The radiation detector of claim 1, wherein the reflector comprises a cast reflector.

8. The radiation detector of claim 1, wherein the reflector comprises a reflective metallic film.

9. The radiation detector of claim 1, wherein the reflector comprises a composite reflector.

10. The radiation detector of claim 9, wherein the composite reflector comprises a reflective metallic film layer and a TiO$_2$-binder layer, and the TiO$_2$-binder layer comprises at least one absorbing material configured to absorb specific wavelengths of the select wavelengths associated with the afterglow.

11. An imaging system comprising:
    a radiation source configured to emit radiation;
    a radiation detector configured to detect the emitted radiation, the radiation detector comprising:
       a scintillator layer configured to absorb the emitted radiation and to emit optical photons in response to the absorbed radiation;
       a photodetector layer configured to absorb the optical photons emitted by the scintillator layer; and
       a reflector configured to reflect the optical photons emitted by the scintillator layer towards the photodetector layer, wherein the reflector comprises at least one absorbing material configured to absorb select wavelengths of optical photons associated with an afterglow emitted by the scintillator layer.

12. The imaging system of claim 11, wherein the reflector comprises a single layer.

13. The imaging system of claim 11, wherein the reflector comprises multiple layers.

14. The imaging system of claim 11, wherein the reflector comprises a cast reflector.

15. The imaging system of claim 11, wherein the reflector comprises a reflective metallic film.

16. The imaging system of claim 11, wherein the reflector comprises a composite reflector.

17. The imaging system of claim 16, wherein the composite reflector comprises a reflective metallic film layer and a TiO$_2$-binder layer, and the TiO$_2$-binder layer comprises the at least one absorbing material.

18. The imaging system of claim 11, wherein the reflector is disposed about the scintillator layer.

19. The imaging system of claim 11, wherein the at least one absorbing material comprises a dye or absorbing pigment material configured to absorb the select wavelengths associated with the afterglow.

20. A radiation detector comprising:
    a reflector configured to be disposed about a scintillator layer and to reflect optical photons emitted by the scintillator layer towards a photodetector layer, wherein the reflector comprises at least one absorbing material configured to absorb select wavelengths of optical photons associated with an afterglow emitted by the scintillator layer.

21. The radiation detector of claim 20, wherein the at least one absorbing material comprises a dye or absorbing pigment configured to absorb specific wavelengths of the select wavelengths associated with the afterglow.

22. The radiation detector of claim 20, wherein the radiation detector comprises a plurality of absorbing materials, wherein each absorbing material is configured to absorb specific wavelengths of the select wavelengths associated with the afterglow.

23. The radiation detector of claim 20, wherein the reflector comprises a cast reflector, a reflective metallic film, or a composite reflector.

* * * * *